United States Patent [19]

Maruo et al.

[11] Patent Number: 4,737,697
[45] Date of Patent: Apr. 12, 1988

[54] INDUSTRIAL ROBOT HAVING A DEVICE FOR TEACHING A MOTOR-DRIVEN ARM WITH VARIABLE SERVO-CONTROL

[75] Inventors: Tomohiro Maruo, Osaka; Toshitugu Inoue, Kyoto; Akiho Hirahata, Osaka; Akiyoshi Nakada, Osaka; Yoshiaki Makizawa, Osaka, all of Japan

[73] Assignee: Matsushita Electric Industrial Co., Ltd.

[21] Appl. No.: 868,654

[22] Filed: May 29, 1986

[30] Foreign Application Priority Data

May 30, 1985 [JP] Japan .................... 60-116921

[51] Int. Cl.$^4$ ............................ G05B 19/42
[52] U.S. Cl. .................... 318/568; 364/513
[58] Field of Search ............ 318/568 G, 568; 364/513

[56] References Cited

U.S. PATENT DOCUMENTS 4,283,764  8/1981  Crum et al. .................... 364/513

Primary Examiner—William M. Shoop, Jr.
Assistant Examiner—Saul M. Bergmann
Attorney, Agent, or Firm—Lowe, Price, LeBlanc, Becker & Shur

[57] ABSTRACT

Disclosed is an industrial robot of the type wherein the robot arm is directly driven by a motor. A position encoder generates a signal representative of the actual position of the arm and a manually controlled position entry switch is operable during a teaching mode. When the arm is manually moved to a desired position, a memory controller responds to the operation of the position entry device by storing the actual position signal in a memory as a target position signal, and reads the stored signal during a playback mode. A servo-control system responds to the actual position signal from the encoder and the target position signal from the memory by controlling the motor so that the actual position of the arm approaches the desired position during the playback mode. The output of the servo-control system is decreased during the teaching mode to render the arm manually movable to the desired position and is increased during the playback mode. Alternatively, the servo-control system is disabled during the teaching mode to permit the robot arm to be manually moved to the desired position and enabled during the playback mode.

21 Claims, 7 Drawing Sheets

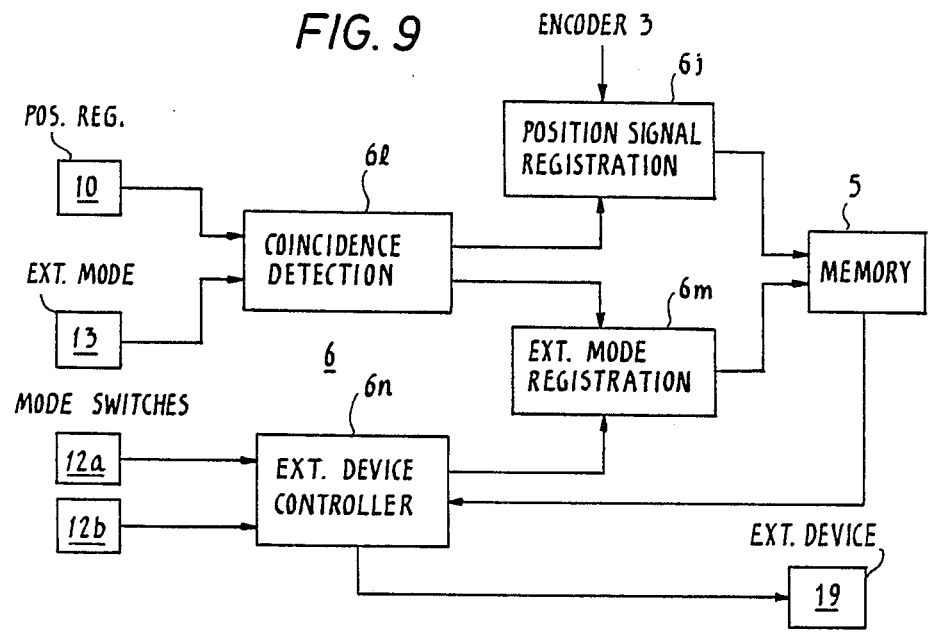

FIG. 11

| MODE | SERVO-UNLOCK 9 | POS. REG. 10 | OUTPUT REG. 11 | EXT. MODE 12 | EX·MD REG. 13 | TIMER REG. 14 | ON-OFF 15 |
|---|---|---|---|---|---|---|---|
| A | 1 | 0 | 0 | α·β | 0 | 0 | 1 |
| B | 0 | 0 | 0 | α·β | 0 | 0 | 1 |
| C | 1 | 1 | 0 | α·β | 0 | 0 | 1 |
| D | 0 | 1 | 0 | α·β | 0 | 0 | 1 |
| E | 0·1 | 0 | 1 | α·β | 0 | 0 | 1 |
| F | 0·1 | 0 | 0 | α/β | 1 | 0 | 1 |
| G | 0·1 | 0 | 0 | α·β | 0 | 1 | 1 |
| H | 0·1 | 1 | 1 | α·β | 0 | 0 | 1 |
| I | 0·1 | 1 | 0 | α/β | 1 | 0 | 1 |
| J | 0·1 | 0 | 0 | α·β | 0·1 | 0 | 1 |
| K | 0·1 | 0·1 | 0·1 | α·β | 0·1 | 0·1 | 0 |

LEGEND:

0 : OFF STATE
1 : ON STATE
α : 1ST MODE
β : 2ND MODE
0·1 : EITHER STATES
α·β : EITHER MODES
α/β : 1ST OR 2ND MODE

INDUSTRIAL ROBOT HAVING A DEVICE FOR TEACHING A MOTOR-DRIVEN ARM WITH VARIABLE SERVO-CONTROL

BACKGROUND OF THE INVENTION

The present invention relates generally to industrial robots, and more particularly to an industrial robot which allows its arms to be manipulated with a minimum of effort and precision.

A prior art industrial robot, as shown and described in Japanese Utility Model No. 59-41033, has a hydraulically operated, vertically swingable arm with a spray gun attached to it to perform paint spray operations in accordance with instructions stored in a memory. The instructions are initially taught by manipulating the robot arm so that the spray gun is located exactly in positions where paint is applied and translating the robot arm into position data for storage into the memory. In playback, the memory is addressed to successively read the stored position data to modulate the hydraulic pressure to move the robot arm along the intended path.

Another prior art industrial robot, which is a more recent and general type of industrial robot, employs an electric motor which directly drives the robot arm and a serve-control system which controls the motor in accordance with a difference which exists between a target position and the actual position of the arm. However, in this prior art, the servo-control system is designed to operate at all times and therefore it causes the robot arm to present a substantial amount of resistance to manual effort when it is desired to move it to a teaching position. As a result, it is difficult to achieve precision teaching control.

SUMMARY OF THE INVENTION

It is therefore an object of the present invention to provide an industrial robot of the type having at least one arm which is directly driven by a motor in a closed loop, wherein the robot arm can be easily manipulated with precision during teaching modes.

This object is attained by reducing the servo-control output to an appropriate value during teaching modes and increasing the servo-control output during playback modes.

Specifically, the industrial robot of the invention comprises a position encoder for generating a position signal representative of the position of the arm with respect to a reference position, a memory and a manually controlled position entry device operable during a teaching mode for generating a position entry command when the arm is manually moved to a desired position. A memory controller is responsive for storing the position signal into the memory and reading the stored signal during a playback mode. A servo-control system responds to the position signal from the encoder and the position signal from the memory by controlling the motor so that the arm approaches the desired position during the playback mode. The output of the servo-control system is decreased during the teaching mode to render the arm manually movable to the desired position and is increased during the playback mode. Alternatively, the servo-control system is disabled during the teaching mode to render the arm manually movable to the desired position without difficulty.

BRIEF DESCRIPTION OF THE DRAWINGS

The present invention will be described in further detail with reference to the accompanying drawings, in which:

FIGS. 4-10 are block diagrams of the control unit of FIG. 2;

FIG. 11 is an illustration of various teaching modes in relation to operation of various teaching commands.

DETAILED DESCRIPTION

Figure 3:
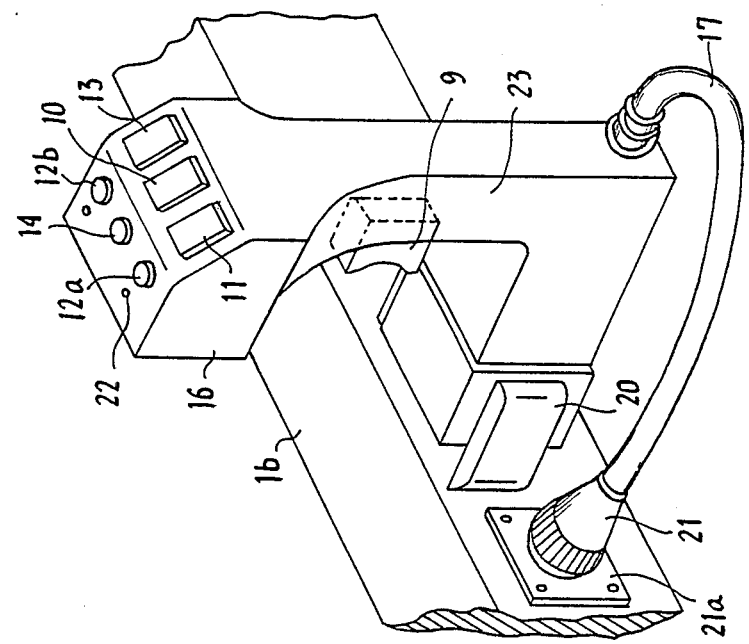
FIG. 3 is a perspective view of the teaching device of FIG. 1.
Figure 1:
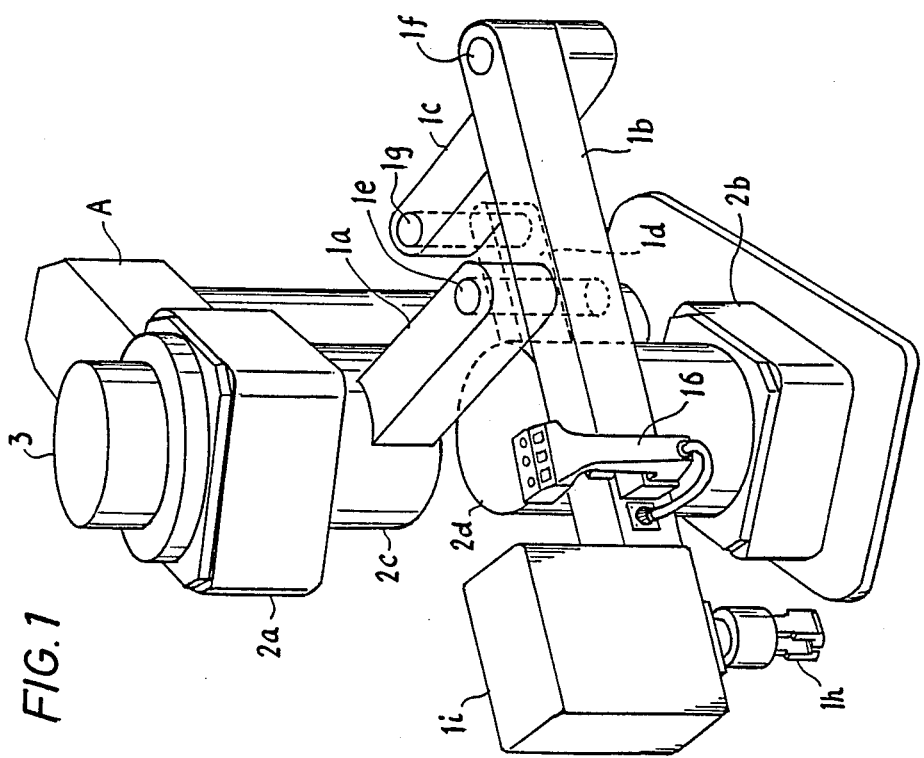
FIG. 1 is a perspective view of an industrial robot of the present invention.
Figure 2:
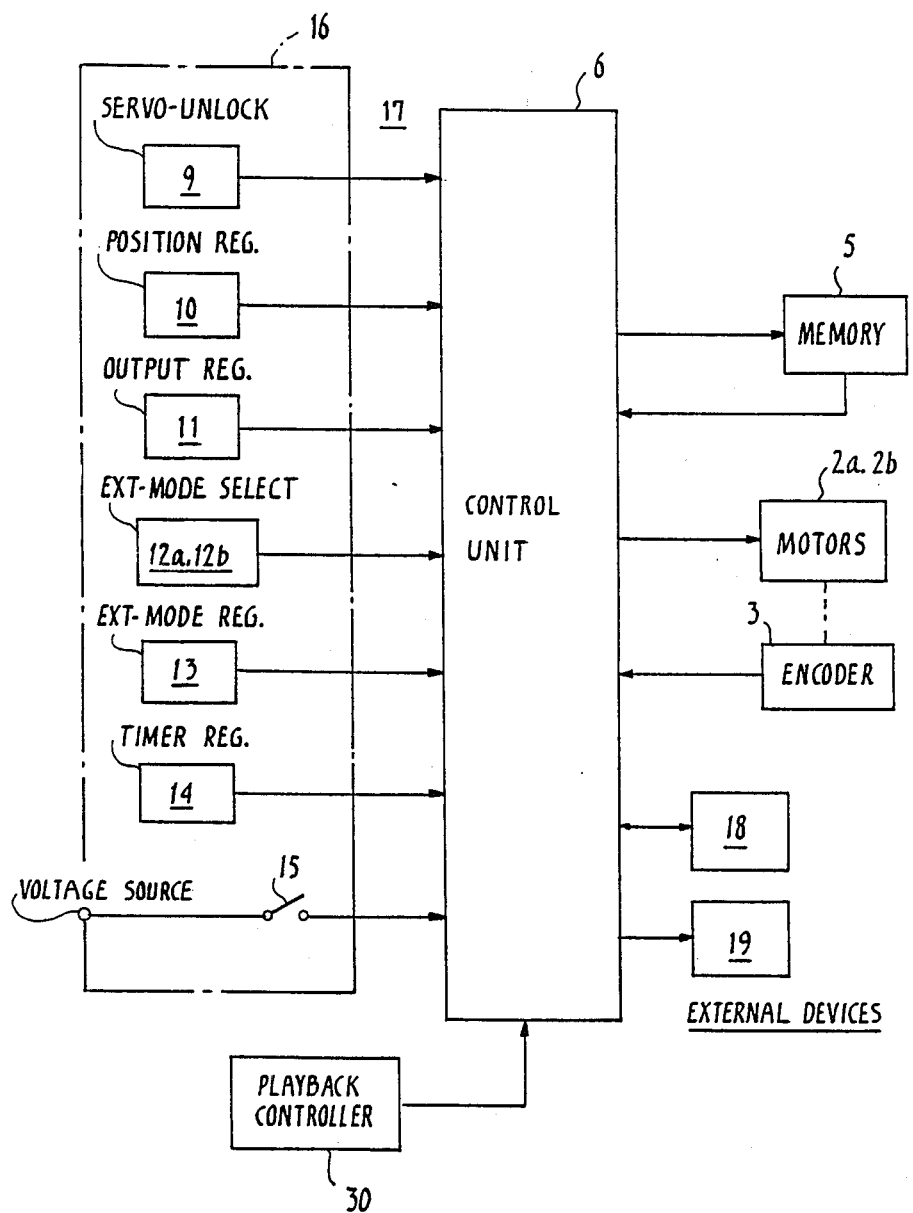
FIG. 2 is a block diagram of a control unit of the industrial robot.

Referring to FIGS. 1 to 3, an industrial robot according to a first preferred embodiment of the invention comprises an upper motor 2a mounted on an arm portion of a stand A and a lower motor 2b on the base of the stand. Motor 2a has a rotary cylinder 2c connected to it for rotation therewith and motor 2b has a rotary cylinder 2d connected thereto for rotation therewith in coaxial relationship with the upper cylinder. An arm 1a extends horizontally from the upper cylinder 2c and is articulated with an arm 1b by means of a roller bearing 1e, the arm 1b being jointed to an arm 1c with a roller bearing 1f. Arm 1c is in turn articulated by a bearing 1g with an arm 1d which extends from the lower cylinder 2d. It is seen that arms 1a, 1b, 1c and 1d form a pantograph. At the free end of arm 1b is mounted a robot hand 1h which is vertically movable by means of a linear motor 1i.

A position encoder 3 is connected to the motor 2a to detect the angular position of arm 1b. On the arm 1b is mounted a teaching device 16 which is connected by a cable 17 to control unit 6 for entry of instruction data thereinto. Teaching device 16 includes plural controls including servo-unlock switch 9, position registration key 10, output signal registration command 11, external mode select command entry device 12, external mode registration command key 13, and timer control knob 14. Teaching device 16 further includes a servo-output control switch 15 through which a voltage is supplied to control unit 6. Control unit 6 processes the input command data and stores its results into a memory 5 and controls motors 2a, 2b in accordance with the stored data. As will be described later, the voltage supplied to motors 2a, 2b is controlled at high or low voltage depending on the operation of the servo-control switch 15. External devices 18 and 19 are connected to the control unit 6 to receive command signals therefrom. Device 18 is of an interactive type which supplies a signal to the control unit indicating its operating mode, whereas device 19 provides no mode signal.

A playback controller 30 is coupled to the control unit 6 to cause it to operate the robot in a playback mode in which the arm 1 is moved along instructed paths in accordance with a stored program in a manner well known in the art.

As shown in FIG. 3, the teaching device 16 is of a generally L-shaped construction with a hand-grip portion 23 on which the servo-unlock switch 9 is located for ease of manipulation. All the command controls except command switch 9 are arranged on top of the device 16 within the reach of an operator's finger while holding the grip-portion 23. This permits the robot arms to be moved by a single hand while holding the teaching device with the other hand, giving a freedom to teaching operation. Teaching device 16 is detachably mounted by a pair of couplers 20 to the arm 1. Cable 17 is detachably connected by a connector 21 on the arm 1 to the control unit 6. Connector 21 serves the function of on-off command 15. Indicator lamps 22 are provided for indicating the operating conditions of mode select knobs 12a and 12b. Teaching device 16 is dismantled from the robot before it is played back in accordance with registered information to reduce the load on the robot arms and prevents unauthorized personnel from entering false information into the teachig device.

Figure 4:
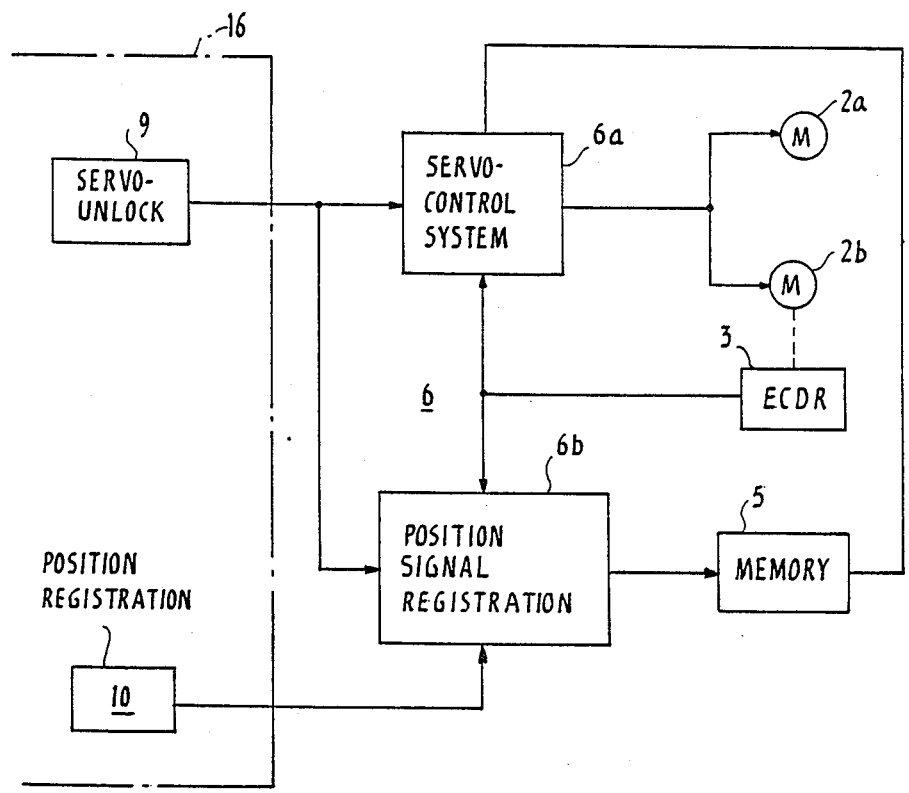

FIGS. 4 to 10 are illustrations of the internal structure of the control unit 6. In FIG. 4, control unit 6 includes a servo control circuit 6a which receives inputs from memory 5 and position encoder 3 and controls the motors 2a and 2b in accordance with the difference between the actual position of arm 1b and a target position represented by the data read out of memory 5 through a closed servo-control loop. The servo-control loop is disabled in response to an output from the servo-unlock switch 9 to deactivate the motors 2a and 2b. This allows the operator to manipulate the robot arms with a minimum of effort. A position signal registration circuit 6b is enabled in response to a position entry command generated by the position signal registration key 10 to discriminate the output of the servo-unlock switch 9 and characterizes the position signal from encoder 3 depending on whether the servo-unlock switch 9 is operated or not in a manner as will be detailed later. The characterized position signal is stored into memory 5.

During the time the servo-control system is unlocked, various control data can be advantageously stored into memory 5 as follows.

Figure 5:
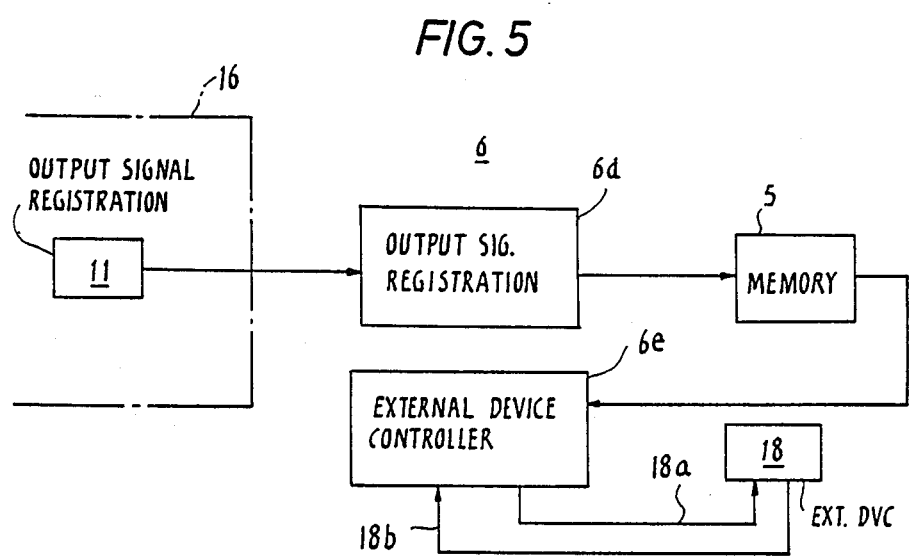

In FIG. 5, an output signal registration circuit 6d is responsive to the output signal registration key 11 to store control data neccesary for the operation of external device 18. During a playback mode, the command data is retrieved from memory 5 into an external device controller 6e which in turn supplies a control signal on lead 18a to external device 18 for the execution of a specified function. External device 18 returns a response on lead 18b to the external device controller 6e, whereupon it proceeds to retrieve the control signal for the execution of the next function.

Figure 6:
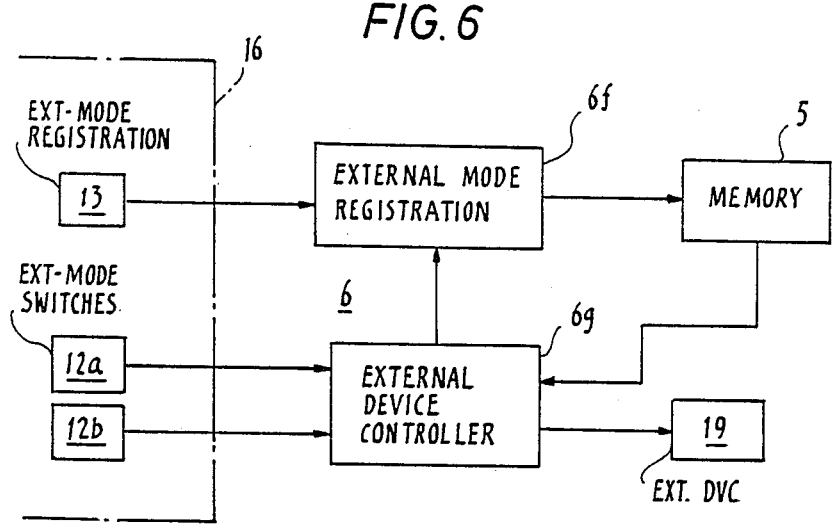

In FIG. 6, the control unit 6 includes an external mode registration circuit 6f connected to the external mode registration key 13 and an external device controller 6g connected to the outputs of external mode select knobs 12a and 12b. When one of the external mode select knob 12a and 12b is operated, external device controller 6g causes the external device 19 to change operating positions according to the selected external mode. External mode registration circuit 6f responds to the operation of external mode registration key 13 by transferring the same mode control data as supplied to the external device 19 to memory 5. In playback, the mode control data is retrieved from memory 5 into the external device controller 6g which controls the device 19 in accordance with the retrieved data.

Figure 7:
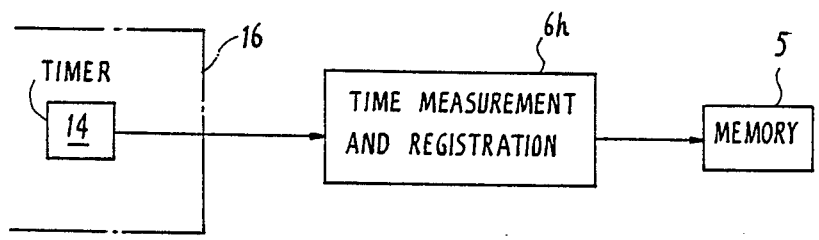

In FIG. 7, a timer registration circuit 6g measures the length of time during which the timer knob 14 is depressed and stores the measured time length signal into memory 5. This teaching operation is effected so that on playback there is a time delay between specified operations.

Figure 8:
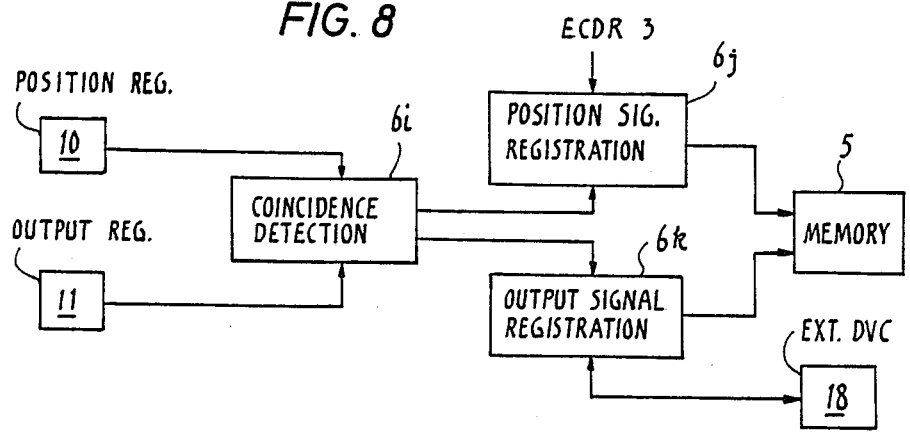

In FIG. 8, a coincidence detector 6i is responsive to the position signal registration key 10 and to the output signal registration command 11 to determine whether these command controls are operated individually or simultaneously. If these commands are simultaneously operated, the coincidence detector 6i directs a position signal registration circuit 6j to characterize the output of position encoder 3 in a manner as described in connection with FIG. 4 and store the characterized position signal into memory 5. Immediately after the registration of the characterized position signal, detector 6i directs an output signal registration circuit 6k to store an external device control data into a storage location of memory 5 which is adjacent the location into which the characterized position signal has been registered. If the position signal registration key 10 is operated exclusively, detector 6i directs the position signal registration circuit 6j exclusively to store characterized position signal into memory 5, and if the output signal registration key 11 is operated exclusively, detector 6i exclusively directs the output signal registration circuit 6k to store the external device control data into memory 5.

The embodiment of FIG. 8 is modified as shown in FIG. 9 in which a coincidence detector 6l is responsive to the position signal registration command 10 and the mode signal registration key 13 to determine if these commands are operated individually or simultaneously. As in the FIG. 8 embodiment, simultaneous entry of commands from keys 10 and 13 causes the detector 6l to sequentially direct the position signal registration circuit 6j to store its output into memory 5 and enables an external mode registration circuit 6m for registration of an external mode into memory 5. During the registration of the external mode, an external device controller 6n detects the indication given by one of the mode select knobs 12a and 12b which is operated and directs the external mode registration circuit 6m to store the information given by selector 12 into memory 5. As in the previous embodiment, individual operation of keys 10 and 13 causes the detector 6l to respectively directs the associated registration circuits.

In FIG. 10, the control unit 6 includes a servo-voltage controller 6o which is connected to voltage source via on-off switch 15, or connector 21, to detect whether the teaching device 16 is connected to the control unit 6 by connector 21. If the connector 21 is connected, the voltage at the input of controller 6o is high and controller 6o directs the servo-control system 6a to operate the motors 2a, 2b at a low voltage. This allows the robot arms to be moved smoothly by the operator's hand. The robot can thus be taught with precision without the possibility of hazard to the operator. If the connector 21 is removed from the robot, the input of controller 6o is low and the latter directs the servo-control system 6a to switch the operating voltage of motors 2a, 2b to normal, high voltage level for playback operations.

Detailed description of the operation of the teaching device will be given as follows with reference to FIG. 11 which illustrates the relations between combinations of commands and their associated operating modes.

Teaching mode A is initiated by operation of servo-unlock switch 9 (see FIG. 4). Motors 2a, 2b are unlocked from the servo-control system and robot arms 1a–1d are manually moved until the robot hand 1h comes precisely to a desired point. With the robot arms being moved to the desired position, restoration of servo-unlock switch 9 will cause the teaching mode to switch to mode B during which the servo-control system 6a is again rendered active, so that motors 2a, 2b are energized with high voltage to keep the robot hand in the desired point.

When the position signal entry key 10 is operated with the operation of servo-unlock switch 9, a teaching mode C is initiated in which the position signal registration circuit 6b reads the output of position encoder 3 and for purposes of storage into memory 5 it characterizes the position signal with a signifying code which indicates that the point given by the position signal is a point located on a path traced by the robot hand.

If the position registration key 10 is operated with the servo-unlock switch 9 being deactivated, a teaching mode D is effected. During the mode D, the position signal registration circuit 6b interprets the output of encoder 3 that the position it indicates is a point at which the robot hand is to be stopped and characterizes it with an appropriate signifying code for storage into memory 5. As a result of the characterization, the amount of positional information stored in memory 5 can be reduced advantageously for efficient use of memory 5. The reduction of such information also results in the reduction of time for processing the positional information during playback. A further advantage of the characterization is that it allows the positional information to be readily classified advantageously for editing purposes.

Operation of output signal registration key 11 initiates a teaching mode E in which the output signal registration circuit 6d, FIG. 5, responds to the output of output-signal registration key 11 by generating data for controlling external device 18 and storing it into memory 5. Such output-signal registration key and their associated registration circuits may be provided as many as desired for operating a plurality of external devices. With the servo-control system 6a being unlocked, such registration commands 11 can selectively be operated for instant registration of external device control data while manipulating the robot arms for registration of positional data using position registration command 10.

Switching operation of external mode selector 12 initiates a teaching mode F in which the external device controller 6g, FIG. 6, selects one of operating positions of the external device 19 in accordance with the switched position of selector 12 and supplies it with a selected operating signal to cause it to change operating states. By doing so, it is possible for the operator to test to see if the operating position of the selected external device 19 is optimum for the robot arms. If the operating position of the external device 19 is not optimum for the robot arms, the selector 12 is switched to the next operating position to seek an optimum operating position. The operating signal is also applied to external mode registration circuit 6f for storing the selected position signal into memory 5 in response to operation of registration command 13 when the optimum position is finally determined (mode G). In playback, the stored external mode signal is read from memory 5 into external device 19 through controller 19. The external mode teaching operation can therefore be performed simultaneously with ease while the robot arms are manipulated in a manner described above.

Operation of the timer knob 14 initiates a teaching mode H in which the timer registration circuit 6h, FIG. 7, measures the length of time the timer command 14 is manually pressed down and registers a time-length code into memory 5. Teaching mode H is advantageously performed between successive command operations during teaching modes E, F and G, so that, in playback, external device 18 or 19 is taught to perform operations with delays between successive movements.

Simultaneous operation of position signal registration key 10 and output signal registration command 11 initiates a teaching mode I in which the coincidence detector 6i, FIG. 8, sequentially controls the position signal registration circuit 6j and output signal registration circuit 6k to store the respective outputs into memory 5. In playback, the robot arms are moved to the position specified by the position registration signal 10, whereupon the output signal registration circuit 6k reads the stored output signal from memory 5 into external device 18 to cause it to perform the specified operation. Robot arms may or may not continue to move after reaching the specified position. In a preferred embodiment, an extra command switch may be provided on the teaching device 16 to simultaneously operate command keys 10 and 11. Teaching mode I can also be performed simultaneously with the manipulation of robot arms.

Simultaneous operation of keys 10 and 13 initiates a teaching mode J in which the coincidence detector 6l, FIG. 9, sequentially directs the position signal registration circuit 6j and external mode registration circuit 6m to sequentially store the respective outputs into memory 5. Teaching mode J can also be performed simultaneously with the manipulation of the robot arms. In playback, the robot arms are moved in accordance with the stored position data to a specified position, whereupon the external device 19 is set in motion to perform the stored function.

When the connector 21 is disconnected from the socket of arm 1b, a teaching mode K is initiated in which the servo-voltage controller 6o directs the servo-control system 6a to supply a high voltage to motors 2a, 2b. When the connector 21 is inserted to the socket for teaching the robot, the controller 6o directs the servo-control system 6a to supply a low voltage to the motors. This ensures easy movement of the robot arms and safety against possible erratic movements of the robot arms beyond calculated bounds which might occur during teaching modes. To enhance the safety measure, plural power cut-off switches may be provided in parallel with each other, so that the motors are operated with high voltage only when these switches are open at the same time.

Figure 12:
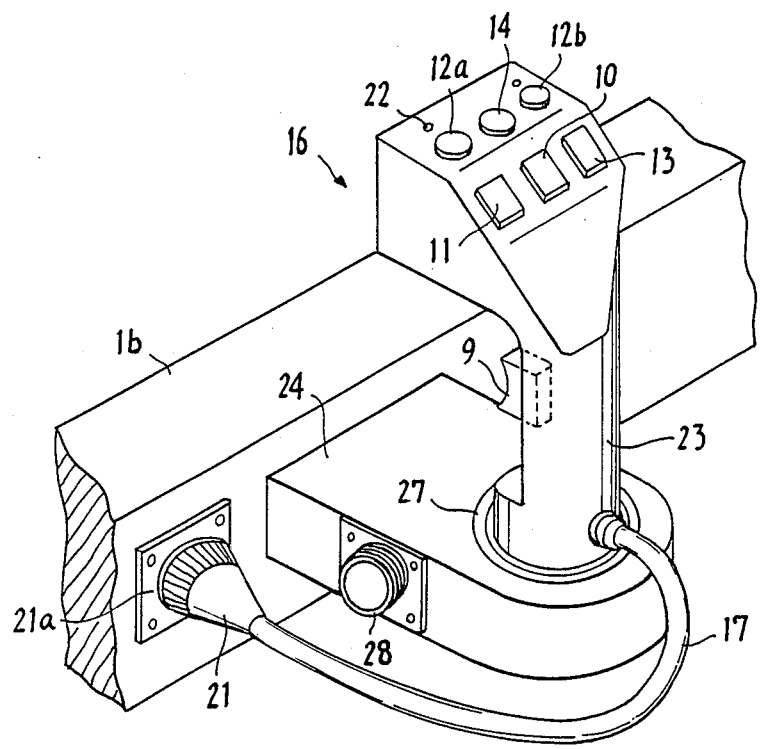
FIG. 12 a perspective view of a modified teaching device of the invention.

FIG. 12 is an illustration of a modified form of the teaching device 16 in which parts corresponding to those in FIG. 3 are marked with the same numerals as used in FIG. 3. In this modification, a horizontal extension plate 24 extends from a side wall of robot arm 1b. Teaching device 16 has its hand-grip portion 23 coupled by a joint 27 to plate 24 to permit it to rotate about the vertical axis of the grip portion 23. A connector mount 28 is attached to a side wall of the extension plate 24 to temporarily hold the connector 21 when it is disconnected from the socket 21a. Rotary joint 27 advantageously allows the controls of teaching device 16 to orient toward the operator at all times while the orientation of the arm 1b is changed to teach the robot.

What is claimed is:

1. An industrial robot having at least one movable arm and a motor directly coupled to and drive said arm, comprising:

a position encoder for generating a position signal representative of the position of said arm with respect to a reference position;

a memory;

manually controlled position entry means operable during a teaching mode for generating a position entry command while said arm is manually moved to a desired position;

position signal registration means responsive to said position entry command for loading said position signal in said memory and reading the stored signal during a playback mode;

servo-control means responsive to the position signal generated by said encoder and the position signal read out of said memory for controlling said motor so that said arm approaches said desired position during said playback mode; and means for decreasing the output of said servocontrol means during said teaching mode to render said arm manually movable to said desired position and for increasing said output during said playback mode.

2. An industrial robot as claimed in claim 1, further comprising means for disabling said servo-control means during said teaching mode.

3. An industrial robot as claimed in claim 2, wherein said position signal registration means characterizes said position signal from said encoder so that when said servo-control means is enabled the characterized position signal indicates a position which is to be passed by said arm during said playback mode and when said servo-control means is disabled the characterized position signal indicates a position in which said arm is stopped during said teaching mode.

4. An industrial robot as claimed in claim 1, further comprising:

manually controlled output-signal entry means operable during said teaching mode for generating an outputsignal entry command;

output-signal registration means for loading a control signal to be used to control an external device in said memory in response to said output-signal entry command; and external device control means for reading the stored control signal from the memory during said playback mode and controlling said external device in accordance with the control signal read out of said memory.

5. An industrial robot as claimed in claim 4, wherein said external device is an interactive device for supplying a return signal to said external device control means in response to execution of an external operation, said external device control means being responsive to said return signal to read the stored control signal from said memory.

6. An industrial robot as claimed in claim 4, further comprising:

coincidence detector means for detecting when said position entry command and said output-signal entry command are generated simultaneously by said position entry means and said output-signal entry means, and wherein said position signal registration means and said output-signal registration means load said position signal and said control signal in sequentially addressable storage locations of the memory in response to the detection of said commands by said coincidence detector means.

7. An industrial robot as claimed in claim 1, further comprising:

manually controlled external mode registration entry means operable during said teaching mode for generating an external mode registration command;

manually controlled external mode indication entry means operable during said teaching mode for selectively indicating a plurality of external modes;

external mode registration means responsive to said external mode registration command for selectively loading plural control signals in said memory in accordance with the indication of said external modes selectively derived by said external mode indication entry means and for reading the stored control signals from the memory during said playback mode and operating an external device in one of a plurality of operating states in accordance with the control signals read out of said memory.

8. An industrial robot as claimed in claim 7, further comprising:

coincidence detector means for detecting when said position entry command and said external mode registration command are simultaneously generated by said position entry means and said external mode registration entry means, and wherein said position signal registration means and said external mode registration means load said position signal and said control signals in sequentially addressable storage locations of the memory in response to the detection of said commands by said coincidence detector means.

9. An industrial robot as claimed in claim 1, further comprising:

manually controlled delay entry means operable during said teaching mode for generating a time delay signal indicating the length of time to be introduced; and delay time registration means for loading said time delay signal in said memory.

10. An industrial robot as claimed in claim 1, wherein said manually controlled position entry means is mounted on a manually operable teaching device, said teaching device being detachably mounted on said arm.

11. An industrial robot as claimed in claim 10, wherein said teaching device has a connector for connecting said position entry means to said memory control means, said connector being engageable with a socket on said arm during said teaching mode and disengageable during said playback mode, said servo-control means being responsive to said connector being engaged with said socket to decrease the output thereof and responsive to said connector being disengaged from said socket to increase said output.

12. An industrial robot as claimed in claim 10, wherein said teaching device has a hand-grip portion, wherein said position entry means is mounted on top of said teaching device.

13. An industrial robot as claimed in claim 2, wherein said position entry means and said disabling means are mounted on a hand-held teaching device detachably mounted on said arm.

14. An industrial robot as claimed in claim 10, wherein said teaching device is mounted rotatably about a vertical axis thereof on said arm.

15. An industrial robot as claimed in claim 13, wherein said teaching device is mounted rotatably about a vertical axis thereof on said arm.

16. An industrial robot comprising:

a plurality of articulated arms horizontally swingably interconnected by vertically extending coupling elements;

a motor for moving said arms;

a position encoder for generating a position signal representative of the position of said arm with respect to a reference position;

a memory;

manually controlled position entry means operable during a teaching mode for generating a position entry command while said arm is manually moved to a desired position;

position signal registration means responsive to said command for loading said position signal in said memory and reading the stored signal during a playback mode;

servo-control means responsive to the position signal from said encoder and the position signal read out of said memory for controlling said motor so that said arm approaches said desired position during said playback mode; and means for disabling said servo-control means during said teaching mode.

17. An industrial robot as claimed in claim 16, wherein said position signal registration means characterizes said position signal from said encoder so that when said servo-control means is enabled the characterized position signal indicates a position which is to be passed by said arm during said playback mode and when said servo-control means is disabled the characterized position signal indicates a position in which said arm is stopped during said teaching mode.

18. An industrial robot as claimed in claim 16, wherein said position entry means and said disabling means are mounted on a hand-held teaching device detachably mounted on said arm.

19. An industrial robot as claimed in claim 18, wherein said teaching device is mounted rotatably about a vertical axis thereof on said arm.

20. An industrial robot comprising:

an arm horizontally rotatable about a vertical axis;

a motor for moving said arm about said vertical axis, said motor being energized with a high-voltage control signal during a playback mode;

a position encoder for generating a position signal representative of the position of said arm with respect to a reference position;

a memory;

a teaching device adapted to be used during a teaching mode, the teaching device including manually controlled position entry means for generating a position entry command while said arm is manually moved to a desired position, manually controlled disable command entry means for generating a disable command and manually controlled voltage switching command entry means for reducing said control signal to a low voltage;

position signal representation means responsive to said position entry command for loading said position signal in said memory and reading the stored signal during said playback mode; and servo-control means responsive, during said playback mode, to said position signal from said encoder and the position signal from said memory for supplying said motor with said high-voltage control signal so that said arm approaches said desired position, said servo-control means being disabled in response to said disable command.

21. An industrial robot as claimed in claim 20, wherein said teaching device is mounted on said arm rotatably about a vertical axis.

* * * * *